(12) United States Patent
Bouti et al.

(10) Patent No.: US 7,695,271 B2
(45) Date of Patent: Apr. 13, 2010

(54) NON-STRINGING NOZZLE TIP

(75) Inventors: Abdeslam Bouti, Swanton, VT (US); Stephen Linwood Gray, Cambridge, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 232 days.

(21) Appl. No.: 12/023,890

(22) Filed: Jan. 31, 2008

(65) Prior Publication Data

US 2009/0194903 A1   Aug. 6, 2009

(51) Int. Cl.
*B29C 45/20* (2006.01)
(52) U.S. Cl. .................. 425/549; 264/328.15
(58) Field of Classification Search ................. 425/549; 264/328.15
See application file for complete search history.

(56) References Cited

U.S. PATENT DOCUMENTS

| | | | |
|---|---|---|---|
| 4,635,851 A * | 1/1987 | Zecman | 425/549 |
| 4,832,254 A | 5/1989 | Peuke et al. | |
| 6,164,954 A | 12/2000 | Mortazavi et al. | |
| 6,302,680 B1 | 10/2001 | Gellert et al. | |
| 6,609,902 B1 | 8/2003 | Blais et al. | |
| 7,175,416 B2 | 2/2007 | Baresich et al. | |

* cited by examiner

*Primary Examiner*—Tim Heitbrink

(57) ABSTRACT

Disclosed is a nozzle tip, having a tip insert attached to a nozzle tip outlet end of a nozzle tip body, the tip insert being made of a material, or having a thermal barrier coating, having a thermal conductivity value of K<10 W/m ° K, and having a lower thermal conductivity than that of the nozzle tip body, to preclude the conduction of excessive heat to the nozzle tip outlet end, and promoting a more decisive fracture of the solidified resin at a gate orifice upon ejection of a molded product, thereby eliminating a string of molten resin and a vestige of excessive height, both of which are undesirable, on the molded product.

24 Claims, 8 Drawing Sheets

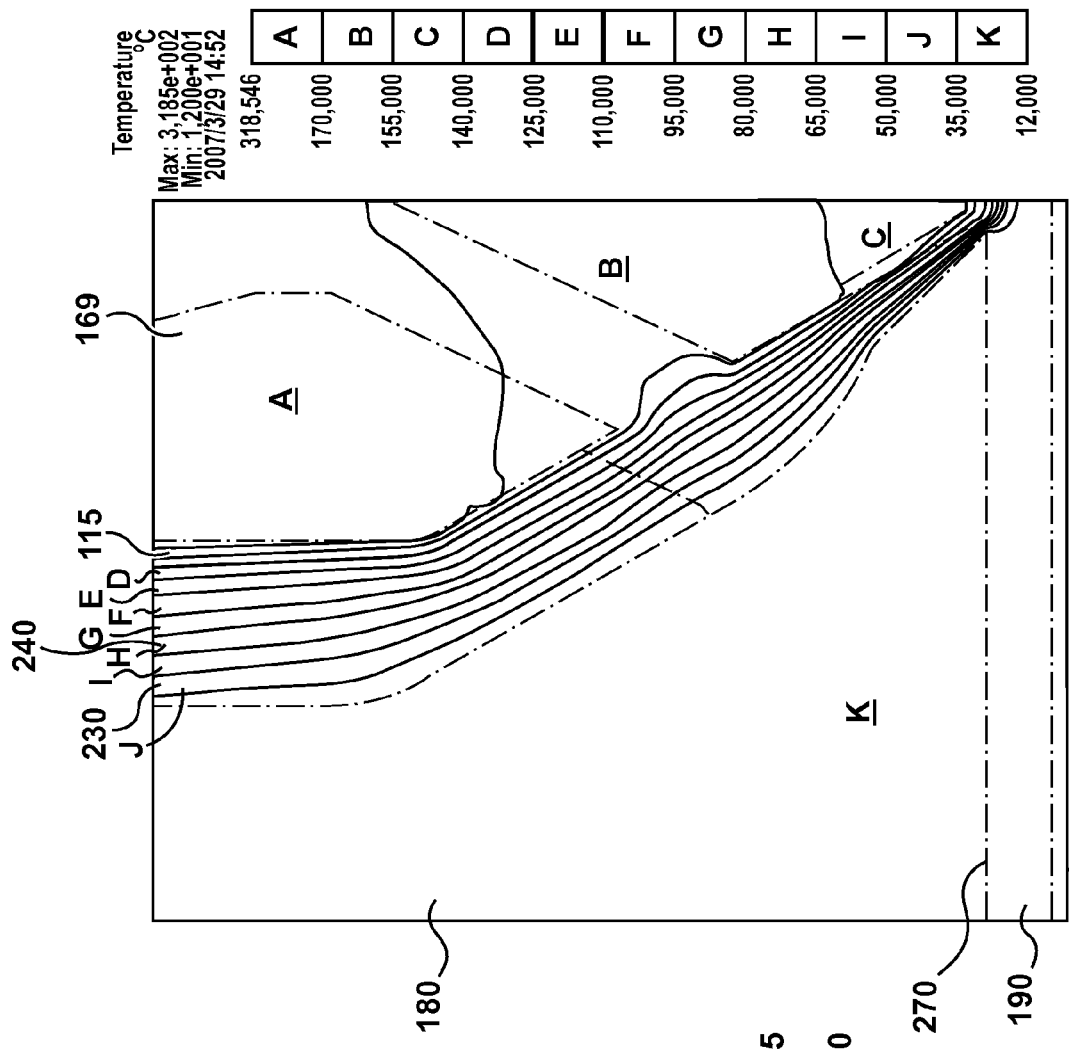
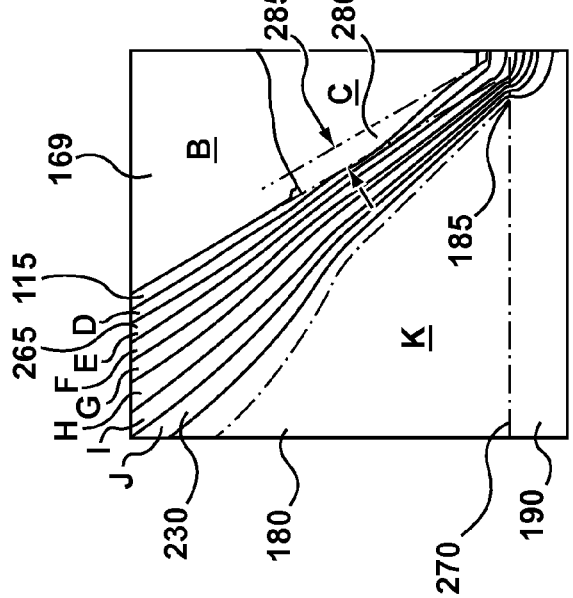
FIG. 7A
FIG. 7B

NON-STRINGING NOZZLE TIP

TECHNICAL FIELD OF THE INVENTION

The present invention relates to, but is not limited to, injection molding systems, and more specifically the invention relates to hot runner systems of injection molding systems, and to the nozzle tips of hot runner systems and how their construction affects the resulting gate quality of molded product.

BACKGROUND

The art of injection molding is well known and documented, but some aspects of producing the perfect molded product is elusive. The basic process of melting, or plasticizing, a resin in an injection molding machine, then conveying said molten resin under pressure through melt channels in a heated manifold system to mating nozzle housings is proven. Each heated nozzle housing melt channel is in fluid communication with respective manifold melt channels to facilitate conduction of the resin at a uniform temperature throughout the hot runner, culminating in passage through a nozzle tip, distally attached to the nozzle housing, through a gate orifice and finally in deposition within a mold cavity, to take the shape of the molded product.

While the resin is optimally heated beyond its melting point throughout its journey within the hot runner, from sprue bushing to nozzle tip, in order to reduce the injection pressure required to move it, the resin must then be quickly cooled once it reaches the gate orifice and mold cavity to facilitate its formation into the final molded product. Both the tip surrounding gate insert as well as the mold cavity and mold core are cooled to a temperature below the melting point of the resin to hasten its solidification. Once the molten resin is injected into the mold cavity, it is afforded a predetermined amount of time to cool down below its softening temperature, so that it will retain its shape and break away from the gate orifice cleanly, when the mold cavity separates from the mold core and the molded product is ejected to further downstream product handling apparatus.

The two most popular methods of gating a molded product, or controlling the flow of resin through a small gate orifice adjacent the mold cavity, are using a valve gate or a hot tip type nozzle assembly. A valve gate device regulates the flow of molten resin through the gate to the mold, while affording precise control of the process, typically via a pneumatically or hydraulically controlled valve stem which reciprocates axially through the center of a nozzle housing melt channel. When cycled back and forth, the valve stem either retracts from the gate orifice to allow resin flow, or intimately mates with the gate orifice to mechanically shut off and prevent resin flow, through the gate orifice. While this type of mechanical control of resin flow through the gate is relatively accurate, its drawbacks include requiring significant space within the hot runner plates to enclose the numerous valve stem drive mechanisms, such as pistons and pneumatic or hydraulic cylinders, which translates to increased costs for thicker hot runner plate steel, the additional cost of a valve stem, piston and the means to drive them for each mold cavity and the cost of replacing or reworking the mating valve stem and gate inserts due to wear and abrasion accumulated from repeated contact during each molding cycle.

Comparatively, the hot tip method of gating to a molded product is a less cumbersome and less expensive device involving simply a heated nozzle housing to convey pressurized resin flow toward a thermally conductive nozzle tip having outlet ports to allow egress of the molten resin through to the adjacent gate orifice. Since this method of transmitting molten resin affords no mechanical means of control of its behaviour at the gate orifice, certain drawbacks of this nozzle tip style are also well known to those skilled in the art of injection molding.

At the beginning of an injection cycle, molten resin is forced, under high speed and pressure, through the hot runner culminating at the nozzle tip where, due to the decreasing orifice diameters, a high shear rate is encountered by the resin which adds additional shear heating to the local area of the nozzle tip and the gate orifice. These conditions help to force the cold slug of resin initially occupying the gate area through the gate orifice and re-melt the cooler layers of resin built up along the gate bubble to allow the flow of new resin into the empty mold cavity. Once the mold cavity is filled with resin, it is held in place for a period of time so that it may cool sufficiently. A layer of static resin solidifies, or freezes, in the gate bubble during this hold time and this solidified resin, or cold slug anchors the molded part to the gate insert. After sufficient cooling time has elapsed, the mold opens and the molded product separates from the gate orifice such that it takes with it a fractured, frozen layer of resin and leaves behind a cold slug in the gate area which acts as a sealing diaphragm, and the cycle continues.

Inherently, the hot tip gating method produces undesirable effects at the gate orifice such as a 'string' and a 'vestige'. A 'string' is defined as thin, fine hair-like extension of warm resin emanating from the gate orifice, attached to the molded product, which upon part ejection from the mold, usually necessitates downstream handling to trim it from said molded product. A string is caused by the remaining sealing diaphragm being too thin, or being too high in temperature, as well as a high residual pressure within the hot runner.

A 'vestige' is defined as a raised witness mark, or post, which is left on the molded product at the location of the gate orifice, and is caused by a lack of a definitive breaking point of the resin attached to the molded product at the gate orifice often caused by either the nozzle tip being recessed too far back from the molding surface or a gate orifice diameter which is relatively too large, or a combination of both. A vestige is characterized by the shape of the frozen layer left on the molded product which defines the resulting gate vestige quality.

The most favorable gate vestige left on a molded product is achieved by rapidly solidifying the resin in the gate area to form an optimal sealing slug before the mold breaks open. The factors affecting this outcome include nozzle tip geometry, gate bubble geometry, gate cooling efficiency and each of their associated temperatures during processing. Additionally, resin processing conditions are factors, specifically the solidification properties of the resin, the residual pressure in the hot runner as well as the amount of time the molded part is held and allowed to cool before ejection from the mold.

Upon mold opening it is desired to generate a brittle fracture across the solidified resin or cold slug such that there is left behind a solid sealing diaphragm in the gate orifice area. Variable mechanical influences, including gate notch geometry and surface finish, as well as resin behaviour and its processing conditions, such as the resin's slug geometry, temperature, fracture properties, and notch sensitivity, and mold break speed, all contribute to forming the optimal gate.

Current hot tip designs provide heat to the gate area to keep the resin molten to prevent its premature cooling or 'freezing' to a temperature below the melting point of the resin during injection. The problem with these designs is that the molten layer created around the tip surface extends beyond the gate orifice and into the mold cavity such that when the mold opens, following a holding stage at which the molded product is allowed to set, it breaks both the solidified and molten resin layers which results in a string. Ideally, to eliminate the string, only the cooled and solidified resin layer should be broken at part ejection. One solution to achieve this is to recess the nozzle tip from the mold cavity surface essentially cooling the gate area by virtue of removing the heat source that is the thermally conductive nozzle tip. While this proposed solution may reduce the frequency of stringing it comes at the expense of creating the potential of high gate vestige. Another solution to minimize potential stringing is to hold the molded part in the mold for an extended period of time so that the cooled mold cavity and core can extract sufficient heat from resin in the gate area thus rendering a more solidified resin. Unfortunately, this method negatively impacts the overall cycle time to produce each molded part and so reduces the potential quantities created per unit time, ultimately impacting realized revenue by the molder.

Still other hot tip designs utilize a thermally conductive tip body fitted with a tip insert made of carbide which, due to its high hardness, is used for its abrasion resistance. While this design prolongs the life of the tip insert by slowing its wear due to erosion from the resin flow, the carbide material has a relatively high thermal conductivity and as such, does little to prevent resin stringing at the gate area.

U.S. Pat. No. 6,164,954 to Mortazavi et al describes an inner portion of an injection molding device, a nozzle tip, as being made of, or having an inner layer or coating of, various materials, including ceramics. The objective of this design is to incur high wear resistance and excellent thermal conductivity. Notwithstanding that the nozzle tip design is for use with a valve gate tip, and so, has no apex to occupy the gate orifice, the conduction of heat to the gate area is undesirable due to the tendency to promote resin stringing.

U.S. Pat. No. 7,175,416 B2 to Baresich et al describes an injection molding nozzle of thermally conductive material which strives to reduce the potential for stringing by geometrically enhancing the nozzle tip such that the wall thickness of said nozzle tip is severely restricted at the tip end thereby choking off the conductive flow of heat within the tip. The resulting, relatively cooled, resin near the tip end is said to have fewer tendencies to produce strings. However, while the nozzle diameter is reduced, it is still an integral part of the nozzle body and, as such, is made of the same thermally conductive material. This limits the desired effect as heat will still be conducted to the tip end at the same rate on a molecular level. Also, because the resin flow of the nozzle in question is axial to the tip, it allows for the warmest resin to occupy the center of the gate orifice area, and since the resin is surrounded by the heated cylinder that is the nozzle tip, it acts as a barrier which precludes the cooled gate insert walls from efficiently removing heat from the central resin flow, which is critical to preventing stringing. Additionally, the cylindrical tip end geometry does not address the resin fracture mechanics and its effect on gate vestige on the molded product.

For the foregoing reasons, the present invention is directed to overcoming one or more of the problems or disadvantages set forth above, and for providing a thermally conductive nozzle tip body featuring an insulating, low thermal conductivity, tip insert which will allow resin to freeze more quickly and specifically at the gate orifice to prevent resin stringing and minimize gate vestige on the molded product.

SUMMARY

The present invention is directed to a nozzle tip body, being highly thermally conductive, having attached thereto, a tip insert of low thermal conductivity, to insulate and cause resin to solidify or 'freeze' only at the gate orifice. The design of such a tip insert ensures that only a thin sealing diaphragm of a solidified resin is allowed to form thereby affording a wide temperature processing window. The tip insert, of low thermal conductivity, allows the resin to cool at a faster rate at the nozzle tip outlet end by blocking heat conduction, from the nozzle tip body and nozzle housing, to the gate orifice. This, in turn, permits the formation of a sealing diaphragm of solidified resin at the gate orifice. The sharp edge, or severe notch geometry, of the gate orifice constrains a high stress concentration at the gate to promote fracture of the solidified resin, upon mold opening, at the mold parting line without breaking into the molten resin surrounding the tip insert thus preventing formation of a string. Multiple variants of design of the nozzle tip can occur depending upon the combination of nozzle tip body and tip insert materials.

In one aspect of the present invention, a nozzle tip body has a thermal conductivity value of K>60 Watts/meter ° Kelvin (W/m ° K). Attached thereto is a tip insert having a comparatively low thermal conductivity value of K<10 W/m ° K.

In another aspect of the present invention, the nozzle tip body is made of a material that is either, a copper alloy, a tungsten alloy, a steel alloy, a molybdenum alloy, carbide, nitride or a metal composite.

In yet another aspect of the present invention, the nozzle tip insert is made of a material which is either ceramic, titanium, steel alloy or a metal composite. The type of ceramic tip insert may be further qualified as being made from zirconia, or alumina.

In still another aspect of the present invention, the nozzle tip, or tip insert, is made of a metallic or ceramic substrate with a thermal barrier coating applied thereto so as to act as an insulator and prevent the conduction of heat from the substrate to the resin in the gate orifice by way of adhering a layer of less thermally conductive material than that of the nozzle tip, or tip insert itself, to its exterior.

In a further aspect of the present invention, the tip insert is joined to the nozzle tip body using, but not limited to, the methods of brazing, welding, threading, an interference fit or a cement.

The present invention provides a nozzle tip body, of high thermally conductive material, having a tip insert, of low thermally conductive material, attached thereto in order to reduce the amount of heat transferred to, and promote rapid cooling of, the molten resin to reduce potential formation of a string, improve the quality of the vestige left on the molded product, and to minimize the amount of time required for each molding cycle.

These and other features, aspects, and advantages of the present invention will become better understood with regard to the following description, appended claims and accompanying drawings.

BRIEF DESCRIPTION OF THE DRAWINGS

FIG. 7A is a magnified section view of a nozzle tip body of copper alloy material having no tip insert but rather a ceramic thermal barrier coating at the tip end, as they reside in a gate insert, illustrating resin layer geometries and relative temperatures, specifically showing that the molten resin terminates above the molded product.

FIG. 7B is a further magnified view of FIG. 7A highlighting the crystallization boundary of the resin at the mold parting line.

DETAILED DESCRIPTION

Figure 1:
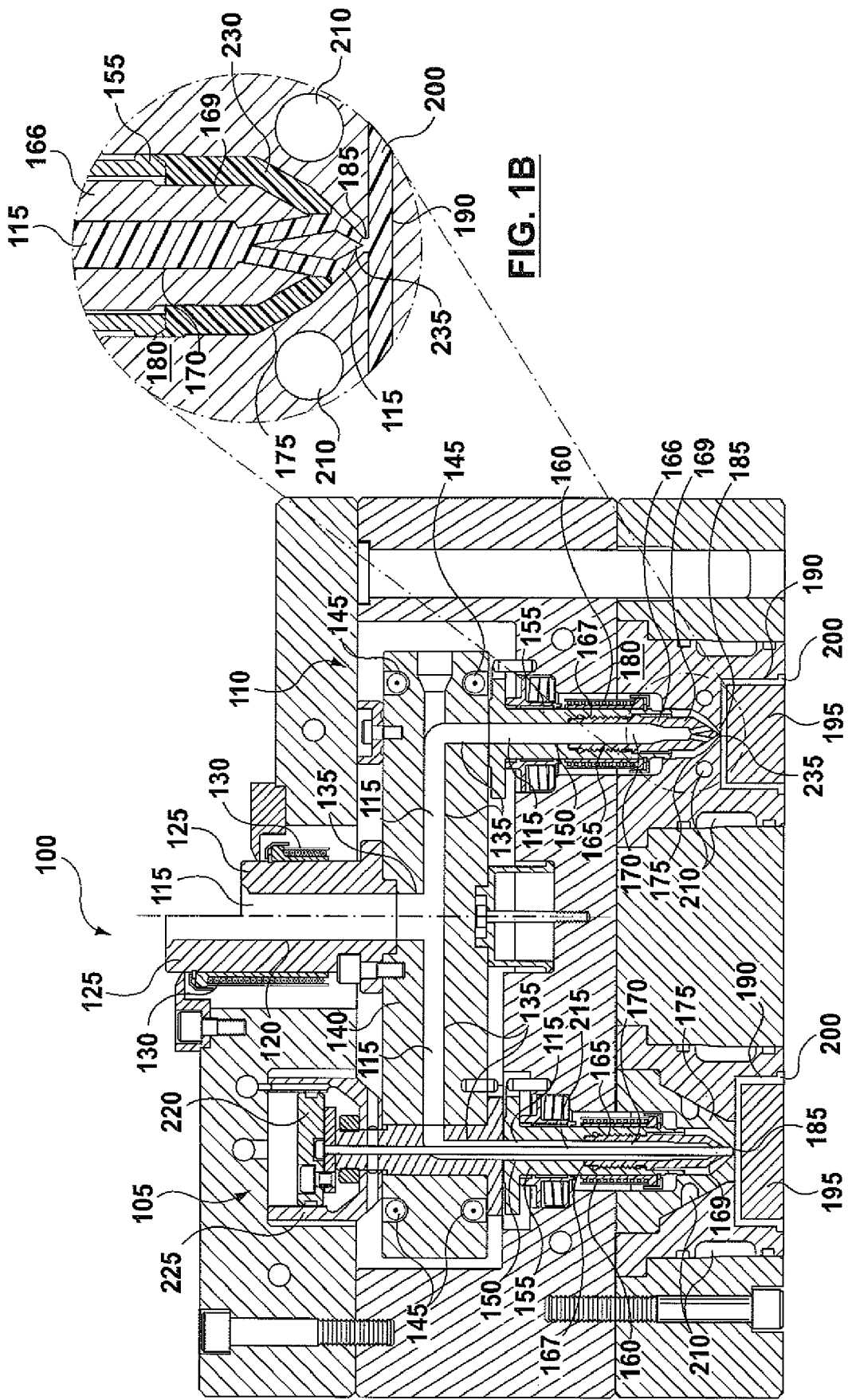
FIG. 1A is cross sectional view of a typical hot runner showing the path of the molten resin from the sprue bushing through to the molded product.
FIG. 1B is an exploded view of the cross section of FIG. 1A, providing a closer view of the nozzle tip body with a tip insert, both of which are comparatively thermally conductive.

Referring to the drawings, and initially to FIG. 1A, an overall view of a hot runner 100 of an injection molding system, and more specifically, two variations of nozzle types, namely a valve gate nozzle assembly 105 and a hot tip nozzle assembly 110, are shown combined for illustrative purposes, as they would rarely be found together in the same hot runner 100. FIG. 1B is a detail of a nozzle tip outlet end 169 of the hot tip nozzle assembly 110, in accordance with the present invention, and will be referred to, in this and in subsequent drawings, as necessary to understand and practice the present invention.

FIG. 1A illustrates the path the molten resin 115 follows through the hot runner 100, all the while being maintained at constant temperature. Originating from a molding machine nozzle (not shown), the molten resin 115 enters a sprue melt channel 120 located axially within a sprue bushing 125, which is heated by a sprue heater 130 surrounding its outer diameter. The sprue melt channel 120 being in fluid communication with a manifold melt channel 135 allows for conduction of the molten resin 115 from the sprue bushing 125 through to a manifold 140 which is also heated via a plurality of manifold heaters 145. The molten resin 115 is then directed to a plurality of manifold melt channels 135 which are perpendicular to the sprue melt channel 120 so as to be distributed equally about the manifold 140 in preparation for mating with a plurality of nozzle housing melt channels 150. Similar to that of the sprue bushing 125, the nozzle housing melt channel 150 is located axially to the nozzle housing 155 which is heated via a nozzle heater 160 surrounding said nozzle housing 155.

A nozzle tip 165, having an nozzle tip inlet end 167 and a nozzle tip outlet end 169, is threadably engaged to the nozzle housing 155, such that a nozzle tip melt channel 170 at the nozzle tip inlet end 167 is in fluid communication with the nozzle housing melt channel 150. The molten resin 115 flows through, and ultimately exits, said nozzle tip melt channel 170, at the nozzle tip outlet end 169, pooling in a gate bubble 175 located within a gate insert 180. Upon application of injection pressure from the molding machine nozzle (not shown), the molten resin 115 is then forced through a gate orifice 185 and into a mold cavity 190 created by the gate insert 180 and a mold core 195 to form a molded product 200. The gate insert 180 is traditionally cooled by forcing water through a plurality of cooling lines 210 to hasten solidification of the molten resin 115 in the gate orifice 185 and of the molded product 200.

As FIG. 1A illustrates, though the mechanism of travel of the molten resin 115 is the same in either the hot tip nozzle assembly 110 or the valve gate nozzle assembly 105, the difference between the two scenarios lies with the manner in which flow of the molten resin 115 is terminated at the gate orifice 185. For this function, the valve gate nozzle assembly 105 relies on a valve stem 215 to physically mate with and close the gate orifice 185 as it is moved into place via a piston 220 in a cylinder 225 which, as illustrated in FIG. 1A, is commonly actuated pneumatically, though other methods exist such as hydraulically or electromechanically.

Referring now to FIG. 1B, a closer look at the nozzle tip outlet end 169 affords a view of general thermal separation of flow of the molten resin 115 compared to solidified resin 230 in the gate bubble 175 as is cooled by the cooling lines 210 nearby. The molten resin 115 flows through the gate orifice 185, filling the mold cavity 190, to create the molded product 200. Unique to the hot tip nozzle assembly 110 is a tip insert 235, which traditionally, is made of a material which is comparably as thermally conductive as that of the nozzle tip body 166, and is installed at the apex of the nozzle tip outlet end 169. Due to its close proximity to the gate orifice 185, the tip insert 235 is instrumental in controlling temperature characteristics of the molten resin 115, though it may be noted that it is not entirely necessary for the nozzle tip 165 to have a tip insert 235, and as such, simply the apex of the nozzle tip outlet end 169 would perform the same thermal management role.

Figure 2:
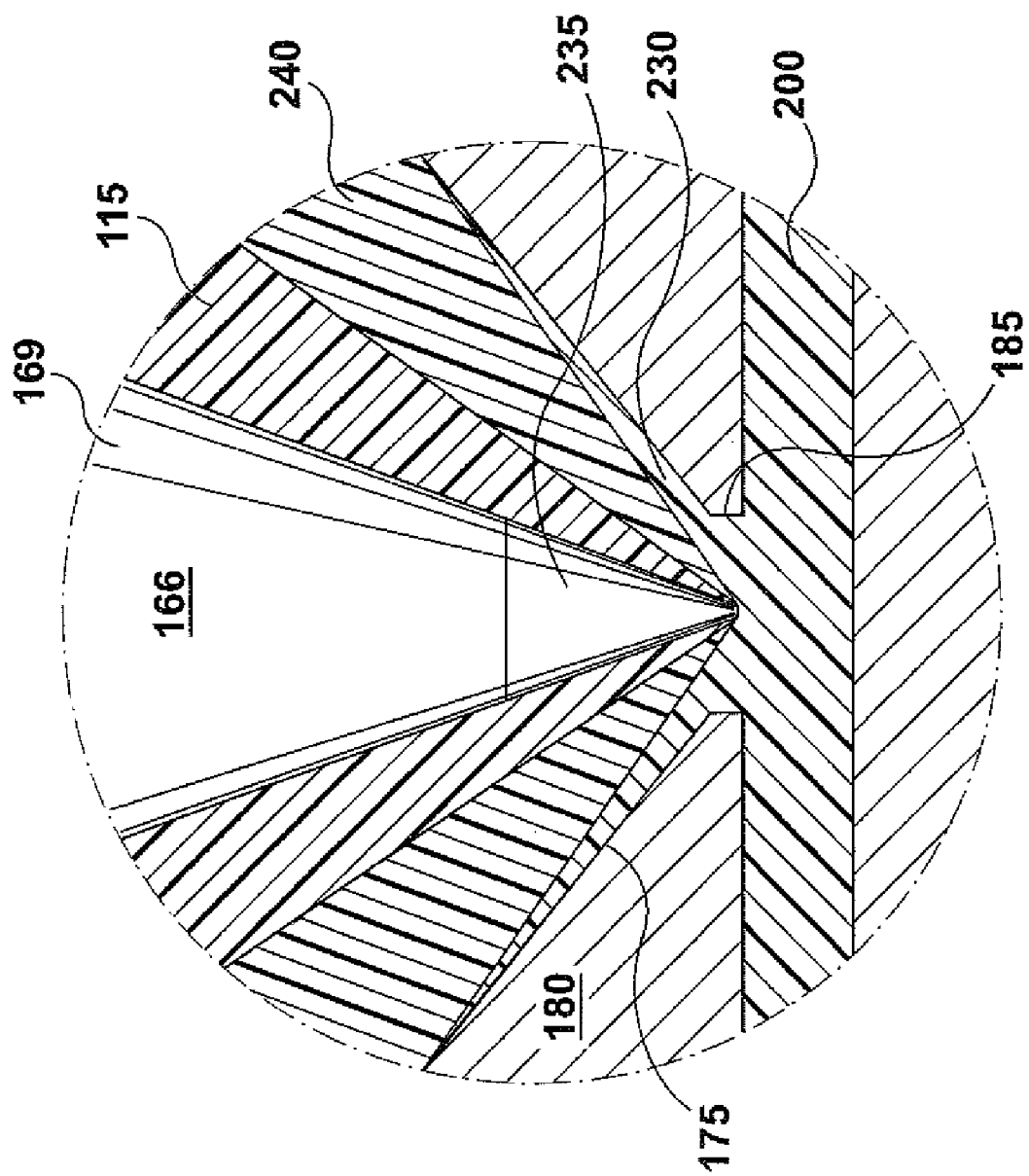
FIG. 2 is a magnified section view of a nozzle tip body with a tip insert, both of which are comparatively thermally conductive, as they reside in a gate insert, illustrating resin layer geometries and relative temperatures, at time of resin solidification.

While the molded product 200 is allowed to cool, FIG. 2 further illustrates the separation of layers of the molten resin 115 with respect to the solidified resin 230, by introducing a transition layer 240 of resin which is below the resin melting temperature but not yet completely solidified. Note particularly how the layer of solidified resin 230 extends from the molded product 200, through the gate orifice 185 and up into, and along the walls of, the gate bubble 175 of the gate insert 180.

Figure 3:
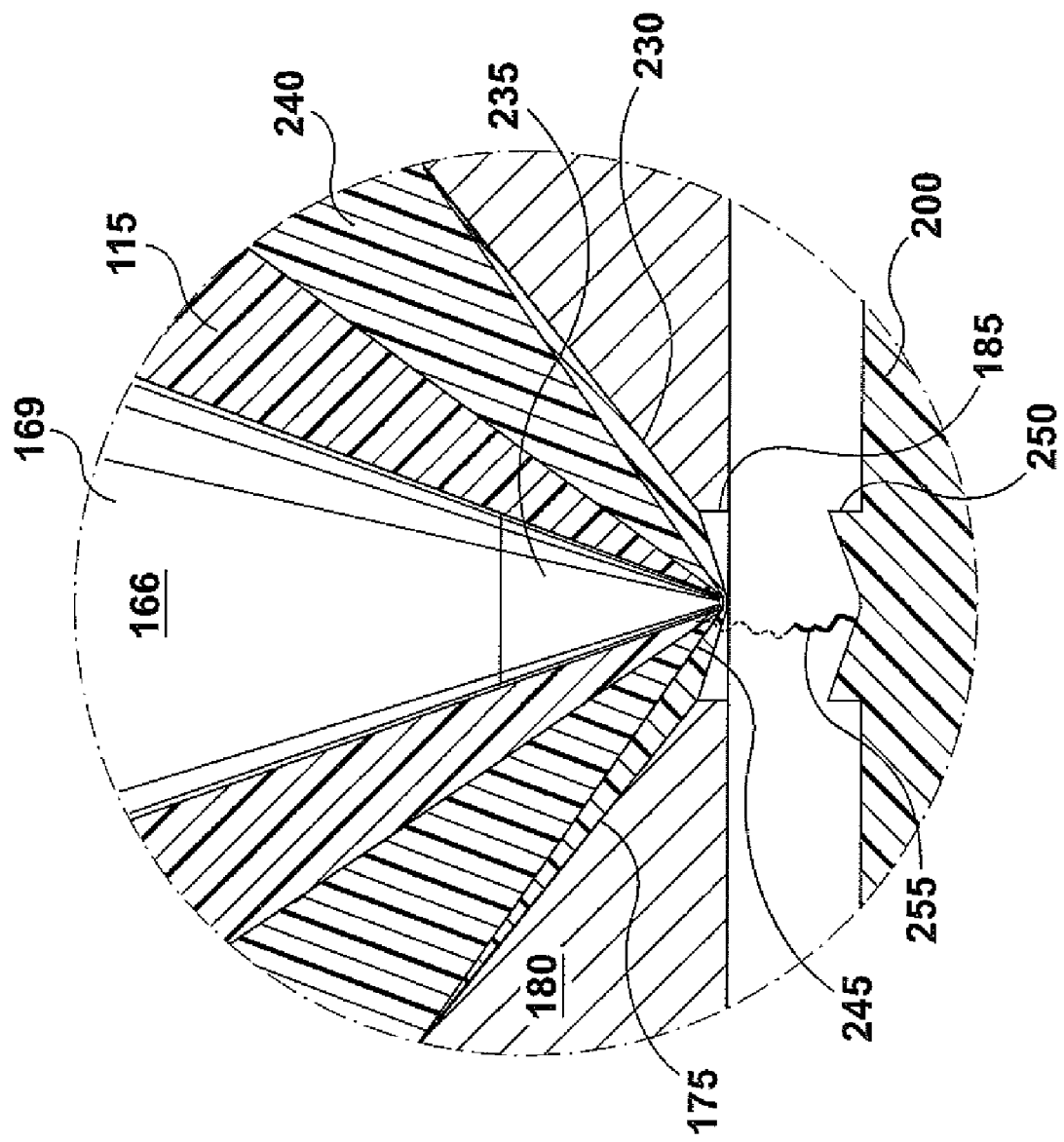
FIG. 3 is a magnified section view of a nozzle tip body with a tip insert, both of which are comparatively thermally conductive, as they reside in a gate insert, illustrating resin layer geometries and relative temperatures, at time of mold break and molded product ejection, also illustrating a vestige and a string.

In FIG. 3, the molded product 200 is being ejected from the gate insert 180 leaving behind a sealing diaphragm 245 of solidified resin 230 in the gate bubble 175 and gate orifice 185. Concurrently, the molded product 200 is left with a vestige 250 of the solidified resin 230 which has been fractured during mold opening. Additionally, and undesirably, when a tip insert 235 is made of a material which is comparably as thermally conductive as that of the nozzle tip body 166, at least one string 255 of resin is produced, connecting the molded product 200 with the molten resin 115 still occupying the gate orifice 185. Formation of a string 255 is typically caused by deficiencies in, or factors affecting, the sealing diaphragm 245, leading to its failure, namely; (i) the sealing diaphragm 245 remaining is too thin, (ii) the sealing diaphragm 245 temperature is too high, and (iii) high residual pressure in the hot runner 100.

Figure 4:
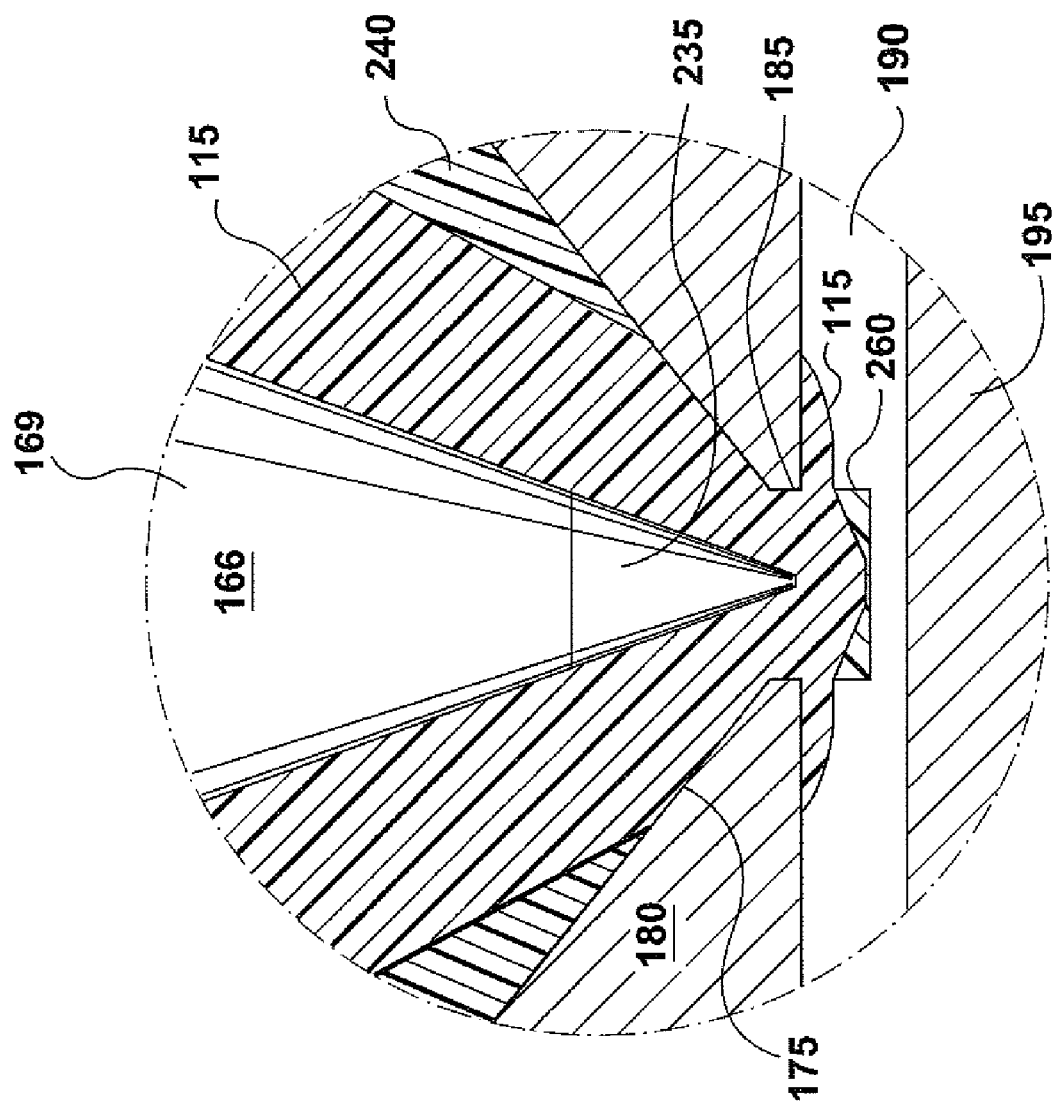
FIG. 4 is a magnified section view of a nozzle tip body with a tip insert, both of which are comparatively thermally conductive, as they reside in a gate insert, illustrating resin layer geometries and relative temperatures, at time of injection of molten resin and solidified resin into the mold cavity.

FIG. 4 represents the point in the injection molding cycle whereby the molded product 200, has been previously ejected and molten resin 115 is being forced through the gate orifice 186 and into the mold cavity 190, which is currently unoccupied. As compared to FIG. 3, previous, the lack of presence of solidified resin 230 along the inside of the gate bubble 175 can be explained by the highly pressurized flow of the molten resin 115, under high shear, re-melting the solidified resin 230 and forcing a cold slug 260 of resin into the mold cavity 190, which is currently vacant.

Figure 5A:
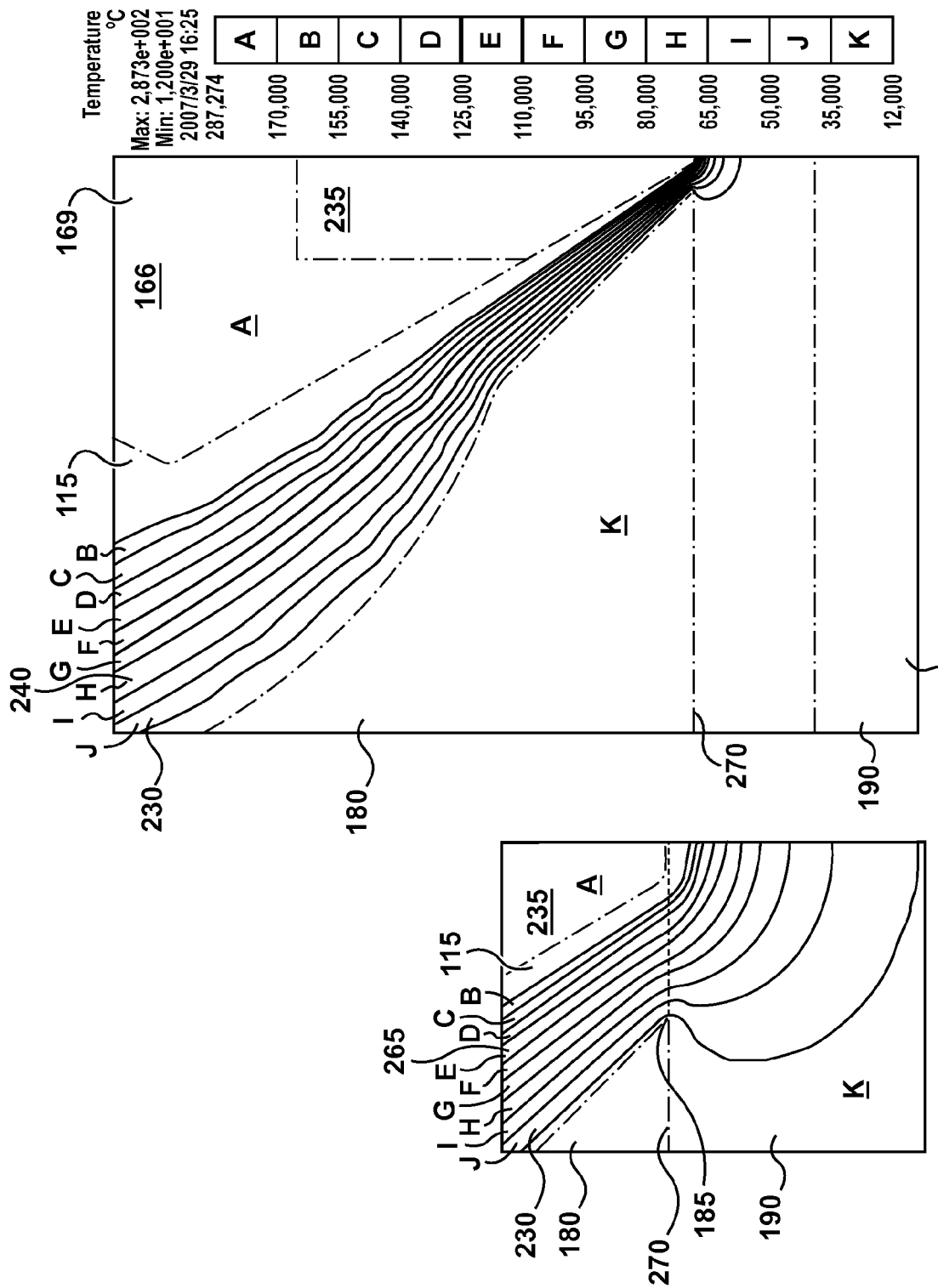
FIG. 5A is a magnified section view of a nozzle tip body of copper alloy material with a tip insert of carbide material as they reside in a gate insert, illustrating resin layer geometries and relative temperatures, specifically showing the molten resin entering the molded product.
Figure 5B:
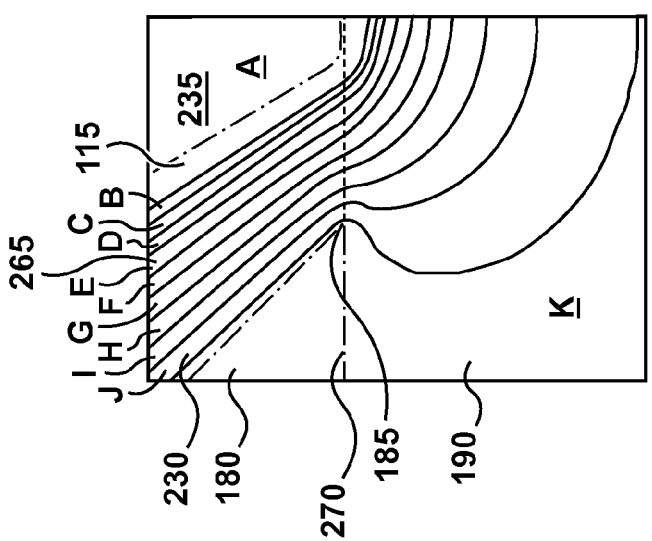
FIG. 5B is a further magnified view of FIG. 5A highlighting the location of the crystallization boundary of the resin at the mold parting line.

Referring now to FIG. 5A, a Finite Element Analysis (FEA) simulation of the thermal characteristics around the nozzle tip outlet end 169, and particularly adjacent to the tip insert 235, reveals that in steady state, that is, when no pressurized injection of the molten resin 115 is occurring, the molten resin 115 will never solidify, or freeze, in the gate orifice 185 due to the excessive thermal conduction of heat by the tip insert 235 of similar thermally conductive material as that of the nozzle tip body 166. When the mold opens to eject the molded product 200, both the molten resin 116 and the solidified resin 230 nearby will be strained, and will result in the production of at least one string 255 at the gate orifice 185. The crystallization boundary 265, shown in FIG. 5B, between the molten resin 115 and the transition layer 240 of resin, marks its phase change, which in this particular example occurs at about 110° C., and may be noted as being located below the mold parting line 270 where the gate orifice 185 meets the top surface of the mold cavity 190. This illustration alludes to the fact that more heat is being applied to the gate orifice 185 than can be conducted away by the cooling lines 210 nearby (not shown) of the gate insert 180.

Figure 6A:
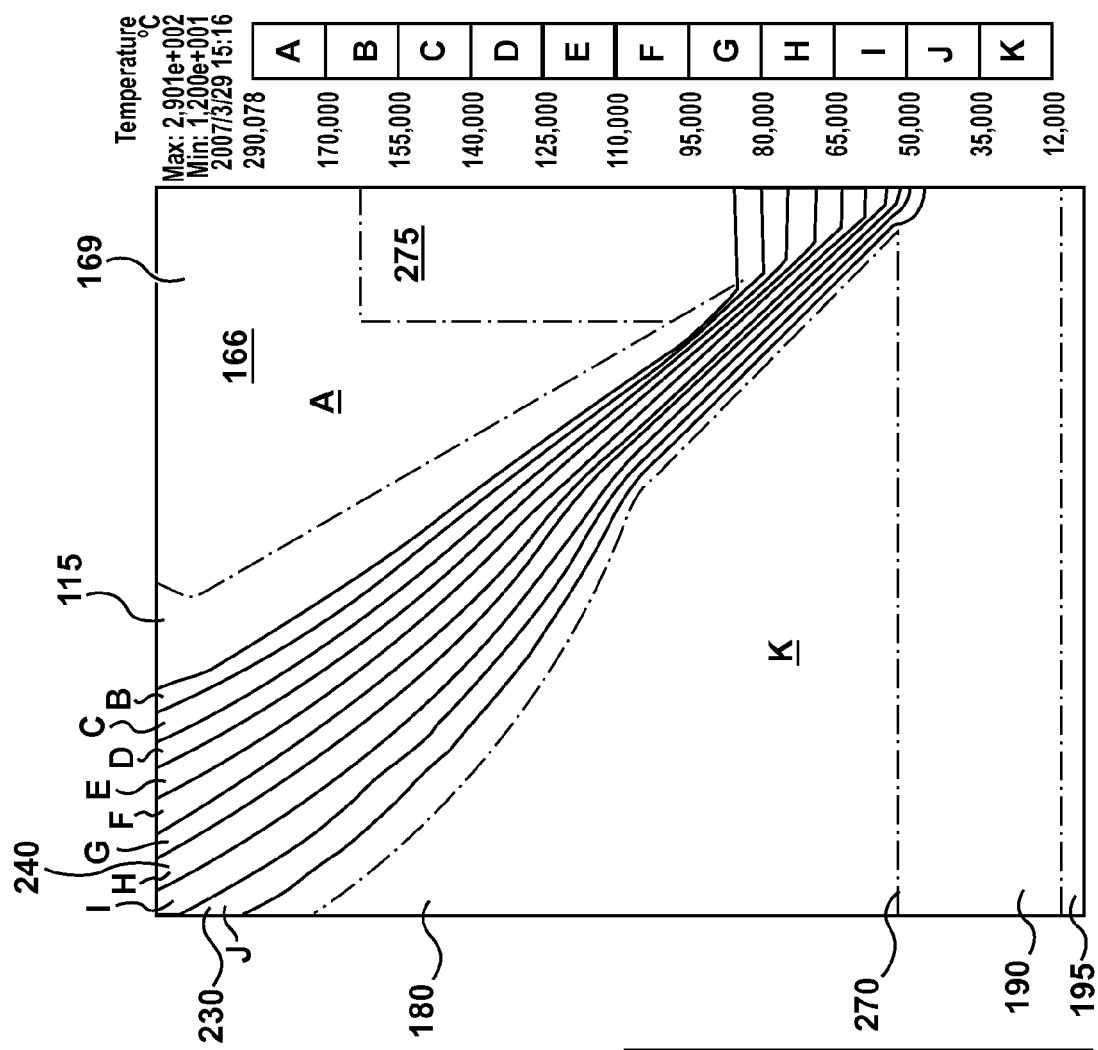
FIG. 6A is a magnified section view of a nozzle tip body of copper alloy material with a ceramic tip insert as they reside in a gate insert, illustrating resin layer geometries and relative temperatures, specifically showing the molten resin terminates well above the molded product.
Figure 6B:
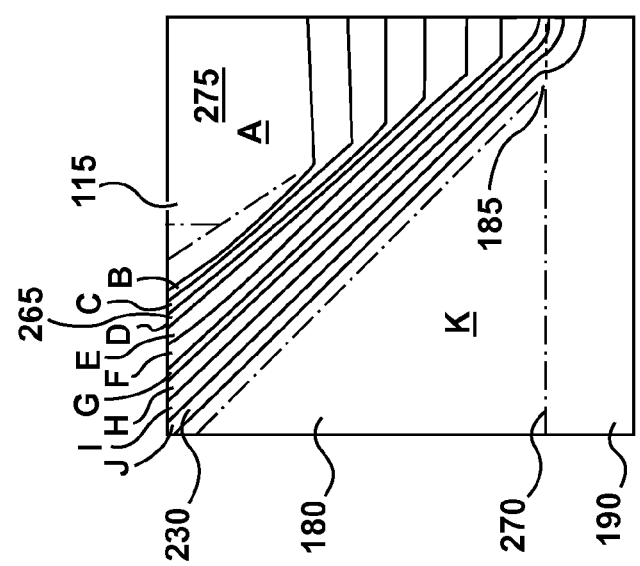
FIG. 6B is a further magnified view of FIG. 6A highlighting the location of the crystallization boundary of the resin at the mold parting line.

Turning now to FIG. 6A, an FEA simulation, similar to FIG. 5A, is shown illustrating the thermal characteristics around the nozzle tip outlet end 169, but with a ceramic tip insert 275, having a diameter of about 2.0 mm, attached thereto in accordance with the present invention, the thermal conductivity of which, K<10 W/m ° K, is significantly lower than that of the nozzle tip body 166 of K>60 W/m ° K. FIG. 6A demonstrates that in steady state, the molten resin 115 will freeze, or solidify, over time since the ceramic tip insert 275 sufficiently blocks the conduction of heat to the gate orifice 185 from the rest of the nozzle tip body 166. Referring to FIG. 6B, the same crystallization boundary 265, again having a temperature of about 110° C., is shifted sufficiently up the ceramic tip insert 276, well above the mold parting line 270, thus indicating that only the solidified resin 230 will occupy the gate orifice 185 and will be strained when the mold opens to eject the molded product 200. The solidified resin 230 at the gate orifice 185 will not induce a string 255 nor a vestige 250 which is excessively high since the ceramic tip insert 275 is positioned flush with the mold parting line 270.

In accordance with yet another embodiment of the present invention, the FEA simulation of FIG. 7A includes the nozzle tip 165, this time devoid of a tip insert 235 but rather a thermal barrier coating 280 applied to the lowermost, outer diameter and apex of the nozzle tip outlet end 169, though a thermal barrier coating 280 may also be applied over a tip insert 235. In this particular example, this frustoconical layer is made of zirconia, but may be of any coating whose thermal conductivity property, K, is less than 10 W/m ° K. Again, as in FIG. 6A, the steady state analysis indicates that the molten resin 115 will indeed freeze, or solidify in the gate orifice 185, over time, which is dependent upon the thermal barrier coating thickness 285. As the thermal barrier coating thickness 285 increases, its ability to block the thermal conduction of heat from the nozzle tip outlet end 169 is also increased. Referring to FIG. 7B, the crystallization boundary 265, again having a temperature of about 110° C., occurs about at the surface of the nozzle tip outlet end 169 which is positioned at the mold parting line 270, thus indicating that only the solidified resin 230 will occupy the gate orifice 185 and will be strained when the mold opens to eject the molded product 200. The solidified resin 230 at the gate orifice 185 will not induce a string 255 nor a vestige 250 which is excessively high since the nozzle tip outlet end 169 is positioned flush with the mold parting line 270.

Figure 8A:
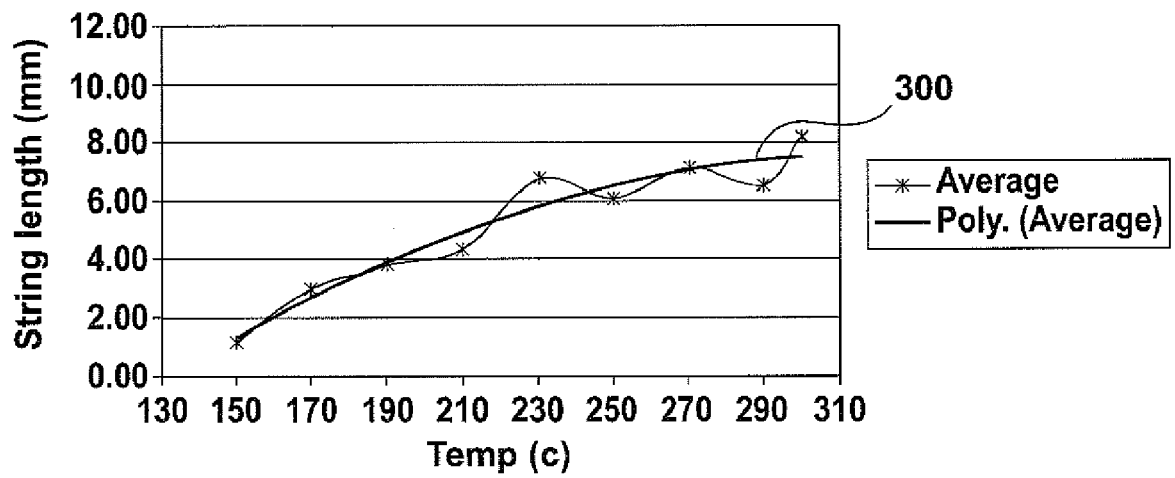
FIGS. 8A and 8B are graphs illustrating resin String Length versus Temperature data for nozzle tip bodies of copper alloy comparing the performance of both a tip insert of carbide material and a ceramic tip insert, respectively.
Figure 8B:
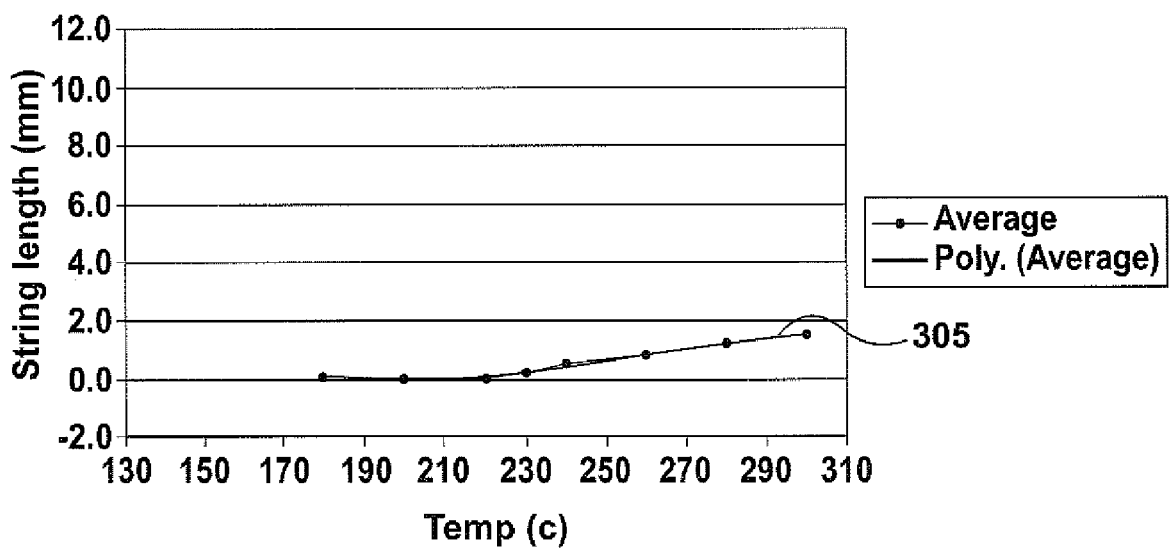

The graph of FIG. 8A illustrates the stringing performance of a nozzle tip body 166 (not shown) made of a copper alloy having a thermal conductivity value, K, of about 250 W/m ° K installed with a tip insert 235 (not shown) of carbide material having a thermal conductivity value, K, of about 80 W/m ° K. A first polynomial curve 300 in FIG. 8A demonstrates the average length, in millimeters, of the string 255 (not shown) as it occurred during testing at various temperatures of the nozzle tip 166. Comparatively, the graph of FIG. 8B illustrates the stringing performance of a nozzle tip body 166 (not shown) made of a copper alloy having a thermal conductivity value, K, of about 250 W/m ° K installed with a ceramic tip insert 275 (not shown) having a thermal conductivity value, K, of about 2 W/m ° K. A second polynomial curve 305 in FIG. 8B demonstrates the average length, in millimeters, of the string 255 (not shown) as it occurred during testing at various temperatures of the nozzle tip 165.

From the two graphs of FIGS. 8A and 8B, it is evident that, dependent on processing temperatures, the nozzle tip body 166 having the ceramic tip insert 275 produced a string 255 from zero to less than 2.0 millimeters in length while the nozzle tip body 166 having the tip insert 235 made of carbide material produced a string 255 from about 10 to about 8.0 millimeters in length. As described previously, a string 255 of any kind is not desirable on the molded product 200 and so the nozzle tip body 166 with the ceramic tip insert 275 is preferred over the nozzle tip body 166 with a tip insert 235 made of carbide material in use in the injection molding industry.

Description of the embodiments of the present inventions provides examples of the present invention, and these examples do not limit the scope of the present invention. It is to be expressly understood that the scope of the present invention is limited by the claims. The concepts described above may be adapted for specific conditions and/or functions, and may be further extended to a variety of other applications that are within the scope of the present invention.

Having thus described the embodiments of the present invention, it will be apparent that modifications and enhancements are possible without departing from the concepts as described. Therefore, what is to be protected by way of letters patent are limited by the scope of the following claims:

What is claimed is:

1. A nozzle tip, comprising:
a nozzle tip body;
a nozzle tip inlet end for ingress of a molten resin;
a nozzle tip outlet end for egress of the molten resin;
a nozzle tip melt channel, located axially therethrough; and
a tip insert, distally attached to the nozzle tip body at the nozzle tip outlet end, wherein the tip insert has a thermal conductivity value of K<10 W/m ° K,
the tip insert is installed at the apex of the nozzle tip outlet end, and the tip insert is positioned flush with the mold parting line,
wherein in steady state, the molten resin will freeze, or solidify, over time since the tip insert sufficiently blocks the conduction of heat to a gate orifice from the rest of the nozzle tip body, and a solidified resin at the gate orifice will not induce a string nor a vestige since the tip insert is positioned flush with the mold parting line.

2. The nozzle tip of claim 1, wherein the nozzle tip body has a thermal conductivity value of K>60 W/m ° K.

3. The nozzle tip of claim 2, wherein the nozzle tip body is made of a copper alloy.

4. The nozzle tip of claim 2, wherein the nozzle tip body is made of a tungsten alloy.

5. The nozzle tip of claim 2, wherein the nozzle tip body is made of a steel alloy.

6. The nozzle tip of claim 2, wherein the nozzle tip body is made of carbide.

7. The nozzle tip of claim 2, wherein the nozzle tip body is made of molybdenum alloy.

8. The nozzle tip of claim 2, wherein the nozzle tip body is made of nitride.

9. The nozzle tip of claim 2, wherein the nozzle tip body is made of a metal composite.

10. The nozzle tip of claim 1, wherein the tip insert is a ceramic tip insert.

11. The nozzle tip of claim 10, wherein the ceramic tip insert is made of zirconia.

12. The nozzle tip of claim 10, wherein the ceramic tip insert is made of alumina.

13. The nozzle tip of claim 1, wherein the tip insert is made of titanium.

14. The nozzle tip of claim 1, wherein the tip insert is made of a steel alloy.

15. The nozzle tip of claim 1, wherein the tip insert is made of a metal composite.

16. The nozzle tip of claim 1, wherein the tip insert is enveloped with a thermal barrier coating.

17. The nozzle tip of claim 16, wherein the thermal barrier coating has a thermal conductivity value of K<10 W/m ° K.

18. A nozzle tip, for use in a hot runner, comprising:
a nozzle tip body;
a nozzle tip inlet end for ingress of a molten resin;
a nozzle tip outlet end for egress of the molten resin;
a nozzle tip melt channel, located axially therethrough; and
a tip insert, distally attached to the nozzle tip body at the nozzle tip outlet end, wherein the tip insert has a thermal conductivity value of K<10 W/m ° K,
the tip insert is installed at the apex of the nozzle tip outlet end, and the tip insert is positioned flush with the mold parting line,
wherein in steady state, the molten resin will freeze, or solidify, over time since the tip insert sufficiently blocks the conduction of heat to a gate orifice from the rest of the nozzle tip body, and a solidified resin at the gate orifice will not induce a string nor a vestige since the tip insert is positioned flush with the mold parting line.

19. The nozzle tip of claim 17, wherein the nozzle tip body has a thermal conductivity value of K>60 W/m ° K.

20. The nozzle tip of claim 17, wherein the tip insert is attached to the nozzle tip body by brazing.

21. The nozzle tip of claim 17, wherein the tip insert is attached to the nozzle tip body by welding.

22. The nozzle tip of claim 17, wherein the tip insert is attached to the nozzle tip body using a cement.

23. The nozzle tip of claim 17, wherein the tip insert is threadably attached to the nozzle tip body.

24. The nozzle tip of claim 17, wherein the tip insert is mechanically attached to the nozzle tip body via an interference fit.

* * * * *